United States Patent Office 2,755,268
Patented July 17, 1956

2,755,268

RESINOUS CONDENSATION PRODUCTS OF ACETOACETIC ESTERS AND UNSATURATED ALDEHYDES

Heinz Uelzmann, Ludwigshafen (Rhine), Germany, assignor to Badische Anilin- & Soda-Fabrik Aktiengesellschaft, Ludwigshafen (Rhine), Germany No Drawing. Application May 29, 1952,
Serial No. 290,811

Claims priority, application Germany June 2, 1951

7 Claims. (Cl. 260—37)

This invention relates to the production of new macromolecular compounds from aldehydes and substances with activated methylene groups.

I have found that macromolecular compounds can be prepared by reacting with aldehydes compounds which contain a plurality of activated methylene groups in the molecule. Suitable compounds of this kind are for example polyacyl derivatives derived from carboxylic acids with activated methylene groups and polyfunctional compounds capable of being acylated, such as polyalcohols, as for example butanediols, pentaerythritol, or polyamines, polymercaptans, aminoalcohols and hydroxy- or amino-mercaptans.

The reaction of diacyl derivatives of glycols which contain activated methylene groups in the acyl radicals with aldehydes proceeds with the splitting off of water probably according to the following scheme:

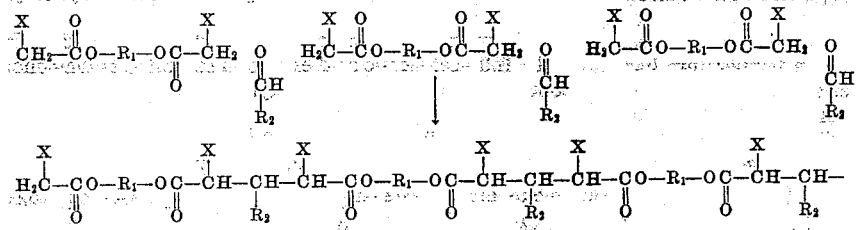

wherein X represents activating groups, as for example carbonyl, —CN or —COOR groups, $R_1$ represents divalent organic radicals having terminal carbon atoms, as for example —$(CH_2)_4$— or —$(CH_2)_2$—S—$(CH_2)_2$— radicals and $R_2$ represents hydrogen or a monovalent organic radical.

Suitable acyl derivatives with strongly activated methylene groups are preferably the radicals of β-keto or α-cyano carboxylic acids, such as the derivatives of acetoacetic acid, propionylacetic acid, butyroacetic acid and cyanoacetic acid.

A great variety of aldehydes may be used for the process, but preferably α,β-unsaturated aldehydes such as crotonaldehyde, acrolein, α-methylacrolein and cinnamaldehyde, and also aliphatic, mixed aliphatic-aromatic and heterocyclic aldehydes. The molecular ratio of aldehyde to polyacyl derivatives with active methylene groups can be varied within wide limits but it is preferable to employ 1 mol of a monoaldehyde to 2 activated methylene groups. It is probable that the aldehyde first reacts with activated methylene groups with the splitting off of water while maintaining the said molecular ratio, whereby activated double linkages are formed which then further react with remaining free activated methylene groups according to the principle of Claisen-Michael.

The reaction may if necessary be carried out in the presence of the known basic reacting catalysts for the aldol condensation, as for example small amounts of alkalies or amines. Hydrogen chloride can also be used as a catalyst. As a rule the reaction takes place at room temperature.

The new macromolecular compounds are sticky viscous to hard and brittle masses depending on the nature and the proportions of the initial materials. An excess of aldehyde leads as a rule to liquid, viscous condensation products which only harden out after days or weeks. Hard and brittle resins are obtained by the reaction of polyacyl derivatives containing more than two activated methylene groups in the molecule, whereby cross-linked products are formed during the reaction. With unsaturated aldehydes cross-linked products are also obtained when employing bifunctional acyl derivatives because simultaneously a polymerization of the unsaturated aldehydes takes place. By reacting mixtures of two or more polyacyl derivatives with aldehydes, still further variations in the properties of the products may be obtained.

The new macromolecular substances may be employed for many purposes and may serve for example as casting resins for the production of shaped articles. For this purpose the mixture of the initial materials or the still-liquid initial condensation products are poured into appropriate hollow molds, whereby shaped articles of any shape or size can be prepared, if desired with the addition of fillers, fibres, pigments, dyestuffs and the like.

Since water is set free by the reaction according to this invention, it is advantageous to carry out the reaction in the presence of substances which are capable of combining with water with the formation of difficultly-volatile, indifferent compounds.

Such substances are preferably calcined gypsum and cement, and also anhydrous sodium sulfate and the like.

The following examples will further illustrate this invention but the invention is not restricted to these examples. The parts are by weight.

Example 1

290 parts of bis-acetoacetic acid thiodiethyleneglycol ester are mixed with 70 parts of crotonaldehyde with an addition of 2.5 parts of piperidine. The condensation takes place at room temperature and is complete after about 2 hours. An elastic, somewhat sticky resin is obtained which can be rolled easily. Its stickiness entirely disappears when it is subjected to a tempering process at about 50° C. to 70° C. for several hours.

If 56 parts of acrolein be employed instead of the crotonaldehyde, a product is obtained which is less elastic.

When the polycondensation is carried out in molds, if desired with an addition of fillers, fibres, pigments and the like, shaped articles are obtained without mechanical operations.

Example 2

358 parts of butanetriol-(1.2.4)-triacetoacetic acid ester (prepared by interchange of ester radicals between acetoacetic ester and butanetriol-(1.2.4) at 130° C. to 200° C.) and 70 parts of crotonaldehyde are mixed and a small amount of piperidine is added. The mass becomes hot and after about 30 to 40 minutes a pale yellow resin similar to colophony is obtained which becomes hard after about 3 hours. It is practically insoluble in most of the usual solvents. It dissolves in dimethylformamide at the boiling point.

When the condensation is carried out with larger amounts of crotonaldehyde, more soluble products are obtained. Thus for example 358 parts of butanetriol-triacetoacetic ester and 140 parts of crotonaldehyde give a resin which does not become solid until after 24 hours and is soluble in acetone at the boiling point. By employing 210 parts of crotonaldehyde, a viscous oil is formed which dissolves well in acetone and is still soft after 3 days.

Example 3

258 parts of butanediol-(1.3)-bisacetoacetic acid ester and 72 parts of butyraldehyde are mixed and about 1.5 parts of piperidine added. A viscous, sticky resin is obtained which may be spread out into films which harden after several days.

Example 4

250 parts of the diamide from 1 mol of hexamethylenediamine and 2 mols of cyanoacetic acid or cyanoacetic ester are fused by heating and 132 parts of cinnamaldehyde are slowly introduced into the melt. After cooling, a hard, brittle resin is obtained.

Example 5

256 parts of thiodiethyleneglycol-bis-cyanoacetic acid ester are reacted with 70 parts of crotonaldehyde with an addition of 1.2 parts of piperidine. A tough, pale brown resin is obtained. 96 parts of furfurol may also be used instead of the crotonaldehyde.

Example 6

358 parts of butanetriol-triacetoacetic acid ester are mixed in a ball mill with 425 parts of calcined gypsum, if desired with the addition of a dyestuff. The mixture is then cooled to about 5° C., 7 parts of piperidine are stirred in and then, after the addition of 98 parts of crotonaldehyde, the mixture is again stirred thoroughly. It is then poured into molds, preferably before its temperature has risen above 10° C. to 15° C. After some hours, articles are obtained which, if the molds employed are smooth, have a high surface gloss and which may be afterhardened by tempering at 50° C. or by storage for several days at room temperature.

The polycondensation may also be carried out in a large flat mold and one side of a wood fibre plate dipped in the reaction solution. There is thus obtained a lustrous, solid coating on the wood fibre plate.

Example 7

590 parts of butanetriol-triacetoacetic acid ester are mixed in a ball mill with 740 parts of cement and worked up into shaped articles as described in Example 6 after the addition of 10 parts of piperidine and 150 parts of crotonaldehyde.

What I claim is:

1. A process for the production of macromolecular compounds which comprises reacting an $\alpha,\beta$-unsaturated aldehyde with a full acetoacetic acid ester of a saturated polyalcohol containing from 2 to 4 hydroxyl groups in the presence of a basic reacting catalyst.

2. A process for the production of macromolecular compounds which comprises reacting crotonaldehyde with a full acetoacetic acid ester of a saturated polyalcohol containing from 2 to 4 hydroxyl groups in the presence of piperidine.

3. A process as claimed in claim 4 wherein substances are added which are capable of combining with water with the formation of solid indifferent compounds.

4. A process for the production of shaped articles from macromolecular compounds which comprises carrying out in molds the reaction between an $\alpha,\beta$-unsaturated aldehyde and a full acetoacetic acid ester of a saturated polyhydric alcohol containing from 2 to 4 hydroxyl groups.

5. A process for the production of shaped articles from macromolecular compounds which comprises carrying out in molds the reaction between an $\alpha,\beta$-unsaturated aldehyde and a full acetoacetic acid ester of a saturated polyhydric alcohol containing from 2 to 4 hydroxyl groups in the presence of a basic reacting catalyst and a substance capable of combining with water selected from the class consisting of calcined gypsum and cement.

6. A resinous condensation product of an $\alpha,\beta$-unsaturated aldehyde and a full acetoacetic acid ester of a saturated polyalcohol containing from 2 to 4 hydroxyl groups.

7. A resinous condensation product of crotonaldehyde and a full acetoacetic acid ester of a saturated polyalcohol containing from 2 to 4 hydroxyl groups.

References Cited in the file of this patent

UNITED STATES PATENTS

| Number | Name | Date |
|---|---|---|
| 2,239,441 | D'Alelio | Apr. 22, 1941 |
| 2,325,376 | D'Alelio | July 27, 1943 |
| 2,326,006 | Bruson | Aug. 3, 1943 |
| 2,426,056 | Rust | Aug. 19, 1947 |
| 2,568,426 | Whetstone | Sept. 18, 1951 |